(12) United States Patent
Shen (10) Patent No.: US 11,251,902 B2
(45) Date of Patent: Feb. 15, 2022

(54) DOWNLINK CONTROL INFORMATION TRANSMISSION METHOD AND RECEIVING METHOD, AND RELATED DEVICE

(71) Applicant: VIVO MOBILE COMMUNICATION CO., LTD., Guangdong (CN)

(72) Inventor: Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 48 days.

(21) Appl. No.: 16/622,688

(22) PCT Filed: Jun. 11, 2018

(86) PCT No.: PCT/CN2018/090599
§ 371 (c)(1),
(2) Date: Dec. 13, 2019

(87) PCT Pub. No.: WO2018/228314
PCT Pub. Date: Dec. 20, 2018

(65) Prior Publication Data
US 2020/0145130 A1    May 7, 2020

(30) Foreign Application Priority Data
Jun. 13, 2017   (CN) .......................... 201710444788.9

(51) Int. Cl.
*H04L 1/00*    (2006.01)
*H04L 5/00*    (2006.01)
(Continued)

(52) U.S. Cl.
CPC .......... *H04L 1/0038* (2013.01); *H04L 5/0044* (2013.01); *H04W 72/042* (2013.01); *H04W 80/08* (2013.01)

(58) Field of Classification Search
CPC ... H04L 1/0038; H04L 5/0044; H04L 5/0053; H04L 1/00; H04L 1/0027; H04W 72/042; H04W 80/08; H04W 72/04
See application file for complete search history.

(56) References Cited

U.S. PATENT DOCUMENTS 9,407,412 B2    8/2016   Guan et al.
10,536,960 B2 *  1/2020   Park ...................... H04W 72/12
(Continued)

FOREIGN PATENT DOCUMENTS

CN    102246548 A    11/2011
CN    102932090 A    2/2013
(Continued)

OTHER PUBLICATIONS

Translation of International Preliminary Report on Patentability and Written Opinion, dated Dec. 17, 2019, for corresponding PCT Application No. PCT/CN2018/090599, International Filing Date Jun. 11, 2018, consisting of 6 pages.
(Continued)

*Primary Examiner* — Ayaz R Sheikh
*Assistant Examiner* — Tarell A Hampton
(74) *Attorney, Agent, or Firm* — Gearhart Law LLC; David Postolski, Esq.

(57) ABSTRACT

The application provides methods for transmitting and receiving Downlink Control Information (DCI), and a related device. The receiving method includes: determining configuration information of to-be-transmitted DCI, based on a corresponding relationship between a DCI Aggregation Level (AL), and/or, a number of blind detections corresponding to the AL, and a payload size of the DCI; configuring the to-be-transmitted DCI, by using the configuration information; and, transmitting the to-be-transmitted DCI to a mobile communication terminal.

18 Claims, 4 Drawing Sheets

(51) Int. Cl.
*H04W 72/04* (2009.01)
*H04W 80/08* (2009.01)

(56) References Cited

U.S. PATENT DOCUMENTS

| | | | |
|---|---|---|---|
| 2013/0114563 | A1 | 5/2013 | Oizumi et al. |
| 2013/0235812 | A1 | 9/2013 | Heo et al. |
| 2014/0146775 | A1 | 5/2014 | Guan et al. |
| 2015/0029984 | A1 | 1/2015 | Wang |
| 2015/0131591 | A1 | 5/2015 | Liu et al. |
| 2017/0374569 | A1 | 12/2017 | Lee et al. |
| 2018/0049203 | A1* | 2/2018 | Xue ................. H04L 5/0053 |
| 2018/0132243 | A1* | 5/2018 | Yang ............. H04W 72/0453 |
| 2018/0227156 | A1* | 8/2018 | Papasakellariou ............... H04W 72/0453 |
| 2020/0015176 | A1* | 1/2020 | Li ................... H04L 5/0082 |
| 2020/0119869 | A1* | 4/2020 | Taherzadeh Boroujeni ............ H04L 5/0094 |
| 2020/0374722 | A1* | 11/2020 | Takeda ............ H04W 72/0493 |

FOREIGN PATENT DOCUMENTS

| | | |
|---|---|---|
| CN | 103326841 A | 9/2013 |
| CN | 103947274 A | 7/2014 |
| CN | 104811263 A | 7/2015 |
| CN | 105281867 A | 1/2016 |
| CN | 105992378 A | 10/2016 |
| WO | 2014067141 A1 | 5/2014 |
| WO | 2016114563 A1 | 7/2016 |
| WO | 2016182378 A1 | 11/2016 |

OTHER PUBLICATIONS

Written Opinion and International Search Report, dated Dec. 20, 2018, for corresponding PCT Application No. PCT/CN2018/090599, International Filing Date Jun. 11, 2018, consisting of 9 pages.
Search Report, dated Apr. 15, 2019, for Application CN 201710444788.9, Priority date of Jun. 13, 2017, consisting of 6 pages.
Translation of Search Report, dated Apr. 15, 2019, for Application CN 201710444788 9, Priority date of Jun. 13, 2017 consisting of 4 pages.
Extended European Search Report, dated May 6, 2020, for corresponding PCT Application No. PCT/CN2018/090599, International Filing Date Jun. 11, 2018, consisting of 8 pages.
First Office Action, dated Mar. 6, 2020, for Application CN 201710444788.9, Priority date of Jun. 13, 2017, consisting of 10 pages.
Translation of First Office Action, dated Mar. 6, 2020, for Application CN 201710444788.9, Priority date of Jun. 13, 2017, consisting of 11 pages.
HTC, "Discussion on EPDCCH Sets and Number of EPDCCH Decoding Candidates," 3GPP TSG-RAN WG1, Meeting #70bis, Oct. 8-12, 2012, San Diego, California, USA.
Guangdong Oppo Mobile Telecom, "PDCCH CORESET configuration and UE procedure on NR-PDCCH," 3GPP TSG RAN WG1, Meeting #89, May 15-19, 2017, Hangzhou, PR China.
Hisilicon Huawei, "Codebook based transmission for UL MIMO," 3GPP TSG RAN WG1, Meeting #89, May 15-19, 2017, Hangzhou, PR China.
Examination Report received for Indian Application No. 202027000002 dated Jul. 22, 2021, 6 Pages.

* cited by examiner

DOWNLINK CONTROL INFORMATION TRANSMISSION METHOD AND RECEIVING METHOD, AND RELATED DEVICE

CROSS-REFERENCE TO RELATED APPLICATION

This application is a national stage application of PCT application number PCT/CN2018/090,599 filed on Jun. 11, 2018, which claims priority to Chinese Patent Application No. 201710444788.9, filed Jun. 13, 2017, both of which disclosures are incorporated herein by reference.

TECHNICAL FIELD

The application relates to communication technologies, and more particularly, to methods for transmitting and receiving Downlink Control Information (DCI), and related devices.

BACKGROUND

The Physical Downlink Control Channel (PDCCH) may be configured to indicate a Physical Downlink Shared Channel (PDSCH) scheduling corresponding to a User Equipment (UE), or time-frequency resources and transmission parameters, etc., which are scheduled by a Physical Uplink Shared Channel (PUSCH) to be transmitted. However, in order to obtain such information, the UE needs to detect the PDCCH first.

Since the PDCCH is transmitted by a Base Station, before transmitting the PDCCH by the base station, the UE has not received other information except for some system information. Therefore, the UE does not learn the number, positions of Control Channel Elements (CCEs) occupied by the PDCCH, and DCI format transmitted by the PDCCH. Thus, detection of the PDCCH may only be implemented by blind detection.

In the related art, Payload Size of the DCI is not considered by DCI and blind detection related configuration. Taking a Long Term Evolution (LTE) as an example, payload sizes of different DCI are not distinguished by the LTE. That is, DCI with different payload sizes is configured with the same number of blind detections.

SUMMARY

In a first aspect, an embodiment of the present disclosure provides a method for transmitting downlink control information (DCI), applied to a base station, and the method includes:

determining configuration information of to-be-transmitted DCI, based on a corresponding relationship between a DCI Aggregation Level (AL), and/or, a number of blind detections corresponding to the AL, and a payload size of the DCI;

configuring the to-be-transmitted DCI based on the configuration information; and, transmitting the to-be-transmitted DCI to a mobile communication terminal.

In a second aspect, an embodiment of the present disclosure also provides a method for receiving DCI, applied to a mobile communication terminal, including:

determining one, or several possible payload sizes of to-be-received DCI;

determining configuration information corresponding to the possible payload size; and, receiving the to-be-received DCI from a base station, based on the configuration information.

In a third aspect, an embodiment of the present disclosure also provides a base station, including:

a determining module, configured to determine configuration information of to-be-transmitted DCI, based on a corresponding relationship between a DCI AL, and/or, a number of blind detections corresponding to the AL, and a payload size of the DCI;

a configuring module, configured to configure the to-be-transmitted DCI based on the configuration information; and, a first transmitting module, configured to transmit the to-be-transmitted DCI to a mobile communication terminal.

In a fourth aspect, an embodiment of the present disclosure also provides a mobile communication terminal, including:

a first determining module, configured to determine one, or several possible payload sizes of to-be-received DCI;

a second determining module, configured to determine configuration information corresponding to the possible payload size; and, a first receiving module, configured to receive the to-be-received DCI from a base station, based on the configuration information.

In a fifth aspect, an embodiment of the present disclosure also provides a base station, including a memory, a processor, and a computer program stored in the memory, which is executable by the processor, wherein when executing the program, the processor is caused to perform the above method for transmitting DCI.

In a sixth aspect, an embodiment of the present disclosure also provides a mobile communication terminal, including a memory, a processor, and a computer program stored in the memory, which is executable by the processor, wherein when executing the program, the processor is caused to perform the above method for receiving DCI.

In a seventh aspect, an embodiment of the present disclosure also provides a computer readable storage medium, which stores a computer program, that when executed by a processor, causing the processor to perform the above method for transmitting DCI, or perform the above method for receiving DCI.

BRIEF DESCRIPTION OF THE DRAWINGS

To describe the technical solutions in the embodiments of the application more clear, brief descriptions of attached figures needing to be used during illustration of embodiments in the application will be provided in the following. It is obvious that, attached figures in the following descriptions are only some embodiments of the application. For persons having ordinary skill in the art, other attached figures may also be obtained based on these attached figures, without paying creative work.

DETAILED DESCRIPTION

The technical solutions in the embodiments of the present disclosure will be clearly and completely described in the following, accompanying with attached figures in the embodiments of the present disclosure. It is obvious that the described embodiments are some embodiments of the present disclosure, instead of all the embodiments. All the other embodiments, which are obtained by persons having ordinary skill in the art without paying creative work and based on embodiments in the present disclosure, are covered by the protection scope of the present disclosure.

An embodiment of the application provides a method for transmitting downlink control information (DCI). Such transmitting method is applied to a base station.

In the method for transmitting DCI provided by an embodiment of the present disclosure, configuration information of to-be-transmitted DCI is determined, by using a corresponding relationship between an Aggregation Level (AL) of DCI, and/or, the number of blind detections corresponding to the AL and payload size of DCI. Since the DCI AL, and/or, the number of blind detections corresponding to the AL are related with payload size, compared with the related art, in which payload size of DCI is not considered when configuring DCI, a new DCI configuration mode is provided, which improves flexibility for configuring DCI.

Figure 1:
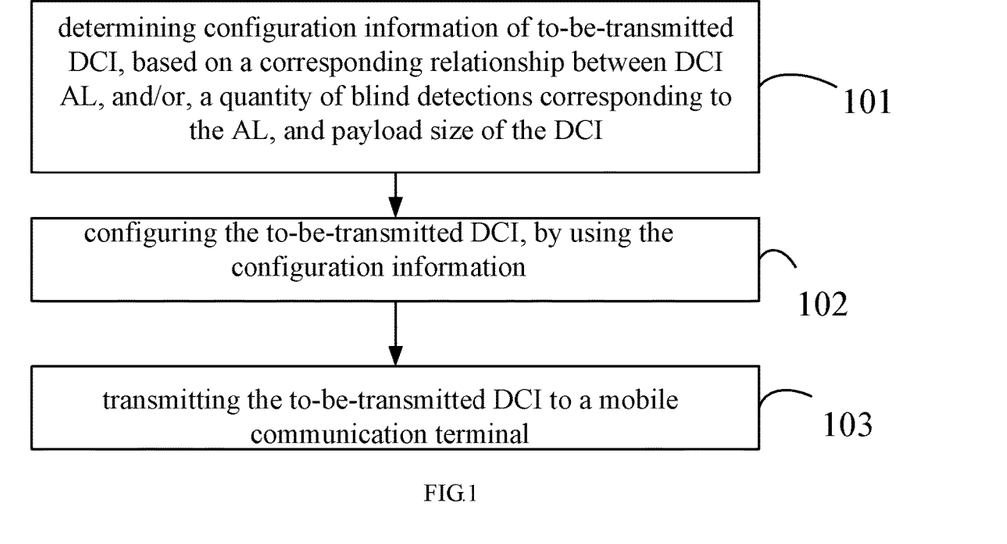
FIG. 1 is a flowchart illustrating a method for transmitting DCI, in accordance with an embodiment of the present disclosure.

Referring to FIG. 1, FIG. 1 is a flowchart illustrating a method for transmitting DCI, in accordance with an embodiment of the present disclosure. As shown in FIG. 1, the method includes the following blocks.

In block 101, determining configuration information of to-be-transmitted DCI, by using a corresponding relationship between DCI AL, and/or, the number of blind detections corresponding to the AL and payload size of DCI.

In the embodiment, the AL represents the number of CCEs occupied by a PDCCH. Specifically, a PDCCH blind detection may possess multiple ALs, e.g., the AL respectively corresponds to AL{1, 2, 4, 8}. The number of blind detections corresponding to the AL is configured to indicate the number of PDCCH Candidates, which correspond to an AL in search space.

In a specific embodiment of the present disclosure, foregoing ALs 1, 2, 4, 8 are described, by taking current LTE system as an example. However, it should be understood that, according to different requirements and the evolution of the system, the number of ALs may be more, and the AL may be greater, which is not repeated here.

Specifically, in the corresponding relationship of the embodiment, DCI AL, and/or, the number of blind detections corresponding to the AL are related with payload size of DCI. For example, DCI with different payload sizes may be configured to support different ALs. Alternatively, the same AL corresponding to DCI with different payload sizes may be configured with different quantities of blind detections, and so on.

In block 102, configuring the to-be-transmitted DCI by using the configuration information.

In block 103, transmitting the to-be-transmitted DCI to a mobile communication terminal.

Specifically, descriptions about the embodiment are provided in the following, by using an example, in which foregoing corresponding relationships are shown in Table 1 and Table 2.

TABLE 1

| AL supported by DCI1 = 60 bit | AL = 1 | AL = 2 | AL = 4 | AL = 8 |
| AL supported by DCI2 = 90 bit | AL = 2 | AL = 4 | AL = 8 | AL = 16 |

TABLE 2

| | AL = 1 | AL = 2 | AL = 4 | AL = 8 | the total number of blind detections |
|---|---|---|---|---|---|
| the number of blind detections, when DCI1 = 60 bit | 6 | 6 | 2 | 2 | 16 |
| the number of blind detections, when DCI2 = 90 bit | 2 | 4 | 2 | 2 | 10 |

With referent to Table 1, the DCI includes DCI1 with payload size 60 bit, and DCI2 with payload size 90 bit. Specifically, DCI1 corresponds to AL1 (that is, AL=1), AL2 (that is, AL=2), AL4 (that is, AL=4) and AL8 (that is, AL=8). However, DCI2 corresponds to AL2 (that is, AL=2), AL4 (that is, AL=4), AL8 (that is, AL=8) and AL16 (that is, AL=16).

In an example, the quantities of Candidates corresponding to AL1, AL2, AL4, AL8 and AL16 are respectively 6, 6, 2, 2, 2. In foregoing Table 1, the total number of blind detections corresponding to DCI1 is 16, and the total number of blind detections corresponding to DCI2 is 12.

With reference to Table 2, DCI includes DCI1 with payload size 60 bit, and DCI2 with payload size 90 bit. Specifically, the quantities of blind detections corresponding to AL1, AL2, AL4 and AL8 of DCI1 are respectively 6, 6, 2, and 2, and the total number of blind detections is 16. The number of blind detections corresponding to AL1, AL2, AL4 and AL8 of DCI2 are respectively 2, 4, 2 and 2, and the total number of blind detections is 10.

However, in the related art, DCI with different payload sizes supports the same AL. Besides, the same AL corresponds to the same number of blind detections. For example, foregoing DCI1 and DCI2 both correspond to AL1, AL2, AL4 and AL8. The quantities of blind detections corresponding to AL1, AL2, AL4 and AL8 are respectively 6, 6, 2 and 2.

According to foregoing comparison, it can be seen that, in the embodiment, the number of blind detections needed by DCI with greater payload size may be reduced.

In the embodiment of the present disclosure, configuration information of to-be-transmitted DCI is determined by using a corresponding relationship between DCI AL, and/or, the number of blind detections corresponding to the AL, and payload size of DCI; the to-be-transmitted DCI is configured by using the configuration information; and the to-be-transmitted DCI is transmitted to a mobile communication terminal. In the embodiment, the DCI AL, and/or, the number of blind detections corresponding to the AL are related with payload size of DCI, this is different from the related art, where payload size of DCI is not considered when configuring DCI. A new DCI configuration mode is provided, which improves flexibility for configuring DCI.

In a specific embodiment of the present disclosure, the mobile communication terminal needs to perform the PDCCH blind detection, based on the corresponding relationship between the DCI AL, and/or, the number of blind detections corresponding to the AL, and payload size of DCI. Such corresponding relationship may be stored in the mobile communication terminal in advance, according to related provisions in the standard, and may be directly read out when needing to be used.

To improve flexibility, in the specific embodiment of the present disclosure, the corresponding relationship may be issued by the base station to the mobile communication terminal through high-level signaling at each use. Since foregoing corresponding relationship is transmitted in real time, the corresponding relationship issued each time may be changed according to difference of current situation, which improves the flexibility.

In this manner, in the embodiment of the present disclosure, the method for transmitting DCI further includes: transmitting the corresponding relationship to the mobile communication terminal.

In the embodiment, the base station may transmit the corresponding relationship, which is between DCI AL, and/or, the number of blind detections corresponding to the AL and payload size of DCI, to the mobile communication terminal, such that the mobile communication terminal may obtain configuration information associated with AL of to-be-transmitted DCI according to the corresponding relationship, and perform the blind detection, based on the configuration information associated with AL of to-be-transmitted DCI.

Optionally, the corresponding relationship is transmitted by using a Control Resource Set (CORESET).

In the embodiment, the CORESET represents a set of time-frequency resources, which is composed of a group of Resource Element Groups (REGs). In the embodiment, the corresponding relationship may be transmitted to the mobile communication terminal through the CORESET, so as to improve diversity and flexibility about transmission of corresponding relationship.

Specifically, the CORESET is defined as follows.

The CORESET is defined as an REG under a group of given parameters Numerology. Control Search Space at least includes the following attributes: AL; the number of Decode Candidates of each AL; a group of CCEs for each Decode Candidate.

The following attributes may belong to the CORESET: transmission/diversity scheme; a mapping from CCE to REG; Pilot structure; Bundling size of a Physical Resource Block (PRB).

The REG is defined as follows.

PDCCH Candidate is composed of a group of CCEs. The CCE is composed of a group of REGs. Within one Orthogonal Frequency Division Multiplexing (OFDM) symbol, REG is one Resource Block (RB);

the communication system of New Radio (NR) at least supports the following functions:

at least for an Enhance Mobile Broadband (eMBB), within an OFDM symbol, in addition to spatial multiplexing to different UEs (i.e., Multi-User Multiple-Input Multiple-Output, MU-MIMO), multiple CCEs cannot be transmitted on the same PRB; for one UE, the channel estimate for one Resource Element (RE) should be reusable in multiple blind decoding involving the RE, in at least the same CORESET and Search Space type (common or UE-specific);

at least for slot-based downlink data transmission, Demodulation Reference Signal (DMRS) position of downlink data is not dynamically changed relative to the start of the slot.

The time-frequency position configuration of CORESET may be informed, by using one or more combinations in the following:

the time-frequency position information of CORESET may be informed through high-level signaling; or, the time-frequency position information of CORESET may be informed through broadcast channel, system information; or, the time-frequency position information of CORESET may be predefined, based on at least one of system bandwidth, sub-carrier space, antenna configuration, carrier frequency.

Specifically, in the embodiment, the CORESET may be pre-configured. It is specified that, how many number of payload sizes of DCI in the CORESET need to be detected. It is also specified that, for DCI with a certain payload size, the AL needs to be detected, and the number of blind detection corresponding to each AL. For example, in the embodiment, DCI length corresponding to each CORESET, the AL needing to be detected by each DCI, and the number of blind detections corresponding to each AL may be pre-configured, and may be transmitted to the mobile communication terminal through high-level signaling. Subsequently, the mobile communication terminal may learn the probable DCI through blind detection, based on pre-configured mapping relationship between CORESET and DCI length, the AL needing to be detected by each DCI and the number of blind detections corresponding to each AL.

Specifically, the mobile communication terminal receives the CORESET from the base station, determines probable payload size of to-be-received DCI based on the CORESET, and determines configuration information corresponding to the probable payload size, so as to receive the to-be-received DCI based on the configuration information corresponding to the probable payload size.

It should be noted that, the DCI length is associated with the CORESET. The DCI length may be changed per slot. The DCI length included by PDCCH detected in the k-th CORESET per slot is associated with the CORESET, in which k is a positive integer.

Optionally, the CORESET is transmitted through high-level signaling.

In a specific embodiment of the present disclosure, the DCI AL, and/or, the number of blind detections corresponding to the AL are associated with payload size of DCI, which can be in various ways, for example:

accompanying with greater payload size, the AL becomes greater;

accompanying with greater payload size, the AL becomes smaller;

accompanying with greater payload size, the number of Candidates corresponding to AL becomes smaller;

accompanying with greater payload size, the number of Candidates corresponding to AL becomes greater;

accompanying with greater payload size, the AL becomes greater and the number of Candidates corresponding to AL becomes smaller;

accompanying with greater payload size, the AL becomes greater and the number of Candidates corresponding to AL becomes greater;

accompanying with greater payload size, the AL becomes smaller and the number of Candidates corresponding to AL becomes smaller;

accompanying with greater payload size, the AL becomes smaller and the number of Candidates corresponding to AL becomes greater.

Taking into account that for DCI with greater payload size, the probability for using a larger AL is greater. Thus, in the specific embodiment of the present disclosure, the following manner is selected, i.e., the number of Candidates becomes smaller, accompanying with greater payload size. That is, in the corresponding relationship, a first number is less than a second number. The first number is a sum of quantities of search space corresponding to all the ALs of a greater one between a first payload size and a second payload size. The second number is a sum of quantities of search space corresponding to all the ALs of a smaller one between the first payload size and the second payload size.

In the embodiment, all the ALs of DCI with different payload sizes correspond to different quantities of search space. Specifically, for all the ALs of DCI with greater payload size, the number of search space may be set to be smaller. For example, if DCI includes DCI1 with payload size 60 bit, and DCI2 with payload size 90 bit, the number of search space corresponding to all the ALs of DCI2 may be set to be smaller than the number of search space corresponding to all the ALs of DCI1. If DCI includes DCI1 with payload size 60 bit, DCI2 with payload size 90 bit, and DCI3 with payload size 120 bit, the number of search space corresponding to all the ALs of DCI2 may be set to be smaller than the number of search space corresponding to all the ALs of DCI1, and the number of search space corresponding to all the ALs of DCI3 may be set to be smaller than the number of search space corresponding to all the ALs of DCI2.

It should be noted that, in the embodiment, the type of DCI payload size is not limited to the first payload size and the second payload size, that is, there may be DCI with three or more payload sizes. Specifically, the type of DCI payload size may be determined implicitly, based on other parameters, or may be determined explicitly, based on network configuration or protocol convention.

In a specific embodiment of the present disclosure, when payload size is greater, it is guaranteed that the number of Candidates is smaller, which may be implemented in various ways, descriptions are respectively provided as follows.

In one method, within the corresponding relationship, the same AL corresponds to the same number of Candidates. A first AL is greater than a second AL. The first AL is the maximum AL among all the ALs of the greater one between the first payload size and the second payload size. The second AL is the maximum AL among all the ALs of the smaller one between the first payload size and the second payload size.

In the embodiment, the same AL corresponds to the same number of Candidates. For example, the quantities of Candidates corresponding to AL1, AL2, AL4, AL8, AL16 are respectively 6, 6, 2, 2, 2.

In the embodiment, DCI with different payload sizes supports different ALs. Specifically, the maximum AL among all the ALs corresponding to DCI with greater payload size may be set to be greater, so as to transmit DCI with AL as greater as possible, and reduce the number of blind detections. For example, DCI includes DCI1 with payload size 60 bit, and DCI2 with payload size 90 bit. DCI1 is used more frequently than DCI2. Subsequently, the maximum AL among all the ALs corresponding to DCI2 may be set to be greater than the maximum AL, which is among all the ALs corresponding to DCI1. If DCI includes DCI1 with payload size 60 bit, DCI2 with payload size 90 bit, and DCI3 with payload size 120 bit. Subsequently, the maximum AL among all the ALs corresponding to DCI2 may be set to be greater than the maximum AL, which is among all the ALs corresponding to DCI1. The maximum AL among all the ALs corresponding to DCI3 may be set to be greater than the maximum AL, which is among all the ALs corresponding to DCI2.

It should be noted that, in the embodiment, the type of DCI payload size is not limited to the first payload size and the second payload size. That is, there may be DCI with three or more payload sizes. Specifically, the type of DCI payload size may be determined implicitly based on other parameters, and may be determined explicitly based on network configuration or protocol convention.

An example is provided in the following to describe the embodiment, in which the quantities of Candidates corresponding to AL1, AL2, AL4, AL8 and AL16 are respectively 6, 6, 2, 2, 2, DCI1 is used more frequently than DCI2, and foregoing corresponding relationships are respectively shown from Table 3 to Table 5.

TABLE 3

| AL supported by DCI1 = 60 bit | AL = 1 | AL = 2 | AL = 4 | AL = 8 |
| AL supported by DCI2 = 90 bit | AL = 1 | AL = 4 | AL = 8 | AL = 16 |

TABLE 4

| AL supported by DCI1 = 60 bit | AL = 1 | AL = 2 | AL = 4 | AL = 8 |
| AL supported by DCI2 = 90 bit | AL = 4 | AL = 8 | AL = 16 | |

TABLE 5

| AL supported by DCI1 = 60 bit | AL = 1 | AL = 2 | AL = 4 | AL = 8 |
| AL supported by DCI2 = 90 bit | AL = 2 | AL = 4 | AL = 8 | AL = 16 |

With reference to Table 3, DCI includes DCI1 with payload size 60 bit, and DCI2 with payload size 90 bit. Specifically, DCI1 corresponds to AL1 (that is, AL=1), AL2 (that is, AL=2), AL4 (that is, AL=4), AL8 (that is, AL=8). However, DCI2 corresponds to AL1 (that is, AL=1), AL4 (that is, AL=4), AL8 (that is, AL=8), AL16 (that is, AL=16). Thus, it can be seen that, the maximum AL among all the ALs corresponding to DCI2 is greater than the maximum AL, which is among all the ALs corresponding to DCI1. The total number of Candidates corresponding to DCI1 is 16. The total number of Candidates corresponding to DCI2 is 12. That is, the total number of blind detections corresponding to DCI2 is less than the total number of blind detections, which corresponds to DCI1.

With reference to Table 4, DCI includes DCI1 with payload size 60 bit, and DCI2 with payload size 90 bit. Specifically, DCI1 corresponds to AL1 (that is, AL=1), AL2 (that is, AL=2), AL4 (that is, AL=4), AL8 (that is, AL=8), while DCI2 corresponds to AL4 (that is, AL=4), AL8 (that is, AL=8), AL16 (that is, AL=16). Thus, it can be seen that, the maximum AL among all the ALs corresponding to DCI2 is greater than the maximum AL, which is among all the ALs corresponding to DCI1. The total number of Candidates corresponding to DCI1 is 16. The total number of Candidates corresponding to DCI2 is 6. That is, the total number of blind detections corresponding to DCI2 is less than the total number of blind detections, which corresponds to DCI1.

With reference to Table 5, DCI includes DCI1 with payload size 60 bit, and DCI2 with payload size 90 bit. Specifically, DCI1 corresponds to AL1 (that is, AL=1), AL2 (that is, AL=2), AL4 (that is, AL=4), AL8 (that is, AL=8), while DCI2 corresponds to AL2 (that is, AL=2), AL4 (that is, AL=4), AL8 (that is, AL=8), AL16 (that is, AL=16). Subsequently, it can be seen that, the maximum AL among all the ALs corresponding to DCI2 is greater than the maximum AL, which is among all the ALs corresponding to DCI1. The total number of Candidates corresponding to DCI1 is 16. The total number of Candidates corresponding to DCI2 is 12. That is, the total number of blind detections corresponding to DCI2 is less than the total number of blind detections, which corresponds to DCI1.

Thus, it can be seen that, in the embodiment, not only the AL corresponding to the DCI with different payload sizes may be flexibly configured, but also the number of blind detections of the DCI with greater payload size may be reduced.

Optionally, in the corresponding relationship, a third AL is greater than a fourth AL. The third AL is the minimum AL among all the ALs corresponding to a greater one between the first payload size and the second payload size. The fourth AL is the minimum AL among all the ALs corresponding to a smaller one between the first payload size and the second payload size.

In the embodiment, since the DCI with a greater payload size has a lower probability of using a smaller AL, the minimum AL among all the ALs corresponding to DCI with greater payload size may be set to be greater than the minimum AL, which is among all the ALs corresponding to DCI with smaller payload size, so as to avoid that the DCI with greater payload size uses smaller AL.

For example, with reference to foregoing Table 5, the minimum AL (that is, AL=2) among all the ALs corresponding to DCI2 is greater than the minimum AL (that is, AL=1), which is among all the ALs corresponding to DCI1. The maximum AL (that is, AL=16) among all the ALs corresponding to DCI2 is greater than the maximum AL (that is, AL=8), which is among all the ALs corresponding to DCI1.

In the foregoing method, for different payload sizes of DCI, the same AL corresponds to the same number (the number of searches) of Candidates. However, in another method of a specific embodiment of the present disclosure, for different payload sizes of DCI, the same AL may be configured with different quantities of Candidates, so as to reduce the number of searches.

This is specifically described as follows.

Optionally, in the corresponding relationship, corresponding to the same AL, the number of Candidates corresponding to the greater one between the first payload size and the second payload size is less than, or equal to the number of Candidates, which corresponds to the smaller one between the first payload size and the second payload size. And, there is at least one AL. Corresponding to the at least one AL, the number of Candidates corresponding to the greater one between the first payload size and the second payload size is less than the number of Candidates, which corresponds to the smaller one between the first payload size and the second payload size.

In the embodiment, the number of Candidates corresponding to the same AL of DCI with different payload sizes is different. Specifically, since DCI with greater payload size has a lower probability for using a smaller AL, the number of Candidates corresponding to a smaller AL may be set to be smaller. For example, with reference to Table 6, the number of blind detections corresponding to AL1 and AL2 of DCI2 is respectively 0 and 2. Subsequently, the total number of blind detections of DCI2 is less than the total number of blind detections of DCI1. Compared with the related art, the total number of blind detections of DCI2 is reduced. More particularly, the number of blind detections of a smaller AL is reduced, so as to reduce power consumption of mobile communication terminals.

TABLE 6

| | AL = 1 | AL = 2 | AL = 4 | AL = 8 | total number of blind detections |
| --- | --- | --- | --- | --- | --- |
| the number of blind detections when DCI1 = 60 bit | 6 | 6 | 2 | 2 | 16 |
| the number of blind detections when DCI2 = 90 bit | 0 | 2 | 2 | 2 | 6 |

It should be noted that, in the embodiment, the type of DCI payload size is not limited to the first payload size and the second payload size. That is, there may be DCI with three or more payload sizes.

Figure 2:
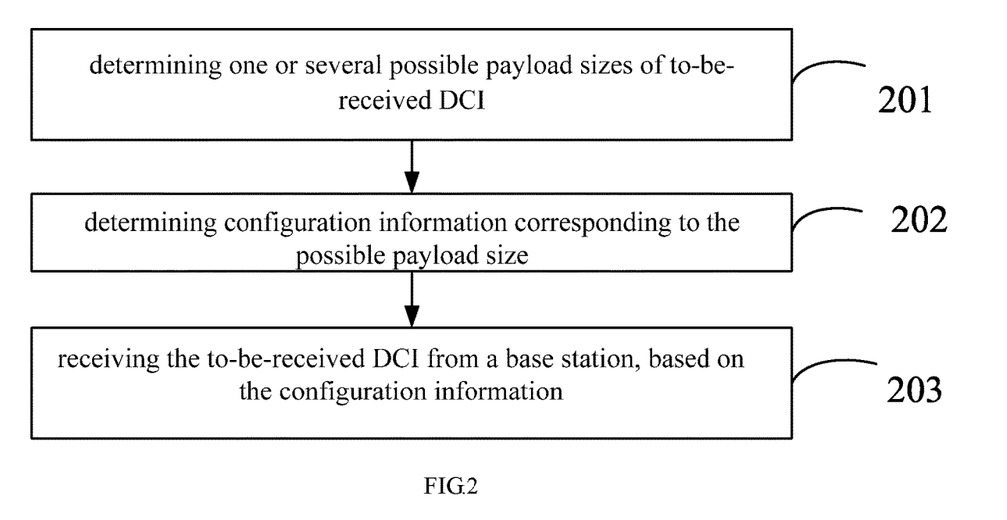
FIG. 2 is a flowchart illustrating a method for receiving DCI, in accordance with an embodiment of the present disclosure.

An embodiment of the present disclosure also provides a method for receiving DCI, which is applied to a mobile communication terminal. FIG. 2 is a flowchart illustrating a method for receiving DCI, in accordance with an embodiment of the present disclosure. As shown in FIG. 2, the method for receiving DCI includes the following blocks.

In block 201, determining one or several possible payload sizes of to-be-received DCI.

In the embodiment, the to-be-received DCI may include a possible payload size, e.g., DCI1 with payload size 60 bit, or DCI2 with payload size 90 bit. The to-be-received DCI may also include multiple possible payload sizes. For example, the to-be-received DCI may include DCI1 with payload size 60 bit, and DCI2 with payload size 90 bit.

In block 202, determining configuration information corresponding to the possible payload size.

In the embodiment, a base station may configure corresponding configuration information for DCI with different payload sizes, and transmit to a mobile communication terminal. The mobile communication terminal may perform a blind detection in search space, based on the configuration information, so as to obtain the to-be-received DCI.

In block 203, receiving the to-be-received DCI from the base station based on the configuration information.

In the method for receiving DCI provided by an embodiment of the present disclosure, after determining one or several possible payload sizes of to-be-received DCI, configuration information corresponding to the possible payload size is determined; and the to-be-received DCI from a base station is received based on the configuration information. In the embodiment, DCI with different payload sizes is configured with corresponding configuration information, and the to-be-received DCI is received based on the configuration information. Compared with the related art, in which payload size of DCI is not considered when receiving DCI, a new method for receiving DCI is provided.

Optionally, the method for receiving DCI further includes: receiving a CORESET corresponding to payload size of the to-be-received DCI from the base station, in which the CORESET records the configuration information associated with AL of the to-be-received DCI.

Correspondingly, the block for determining possible payload size of the to-be-received DCI includes: determining the possible payload size, based on the CORESET.

Correspondingly, the block for determining the configuration information corresponding to the possible payload size, includes: determining the configuration information by analyzing the CORESET.

In the embodiment, the configuration information associated with AL of the to-be-received DCI may include, the AL to be detected by the DCI, the number of blind detections corresponding to each AL, and so on.

Specifically, in the embodiment, the CORESET may be pre-configured. It is specified that how many number of payload sizes of DCI in the CORESET need to be detected, and further specified that the AL needing to be detected by DCI with each kind of payload size, and the number of blind detections corresponding to each AL.

For example, the base station may pre-configure DCI length (that is, payload size) corresponding to each CORESET, the AL needing to be detected by each DCI, the number of blind detections corresponding to each AL, and may transmit to the mobile communication terminal through high-level signaling. Subsequently, the mobile communication terminal may learn the possible DCI through blind detection, based on a mapping relationship between pre-configured CORESET and DCI length, the AL needing to be detected by each DCI, and the number of blind detections corresponding to each AL.

In the embodiment, the mobile communication terminal may quickly determine the possible payload size and configuration information of the to-be-received DCI through the CORESET, and perform the blind detection based on the configuration information, so as to obtain the to-be-received DCI.

Optionally, the CORESET is transmitted through high-level signaling.

Optionally, determining the configuration information corresponding to the possible payload size includes: determining the configuration information corresponding to the possible payload size, based on a corresponding relationship between DCI AL, and/or, the number of blind detections corresponding to the AL, and payload size of DCI.

In the embodiment, the configuration information associated with AL of the DCI is related with payload size of DCI. For example, DCI with different payload sizes may be configured to support a different AL. Or, the same AL corresponding to DCI with different payload sizes may be configured with a different number of blind detections, and so on.

For example, with reference to foregoing Table 1, DCI1 corresponds to AL1, AL2, AL4 and AL8, while DCI2 corresponds to AL2, AL4, AL8 and AL16. With reference to foregoing Table 2, the quantities of blind detections corresponding to AL1, AL2, AL4 and AL8 of DCI1 are respectively 6, 6, 2 and 2, and the total number of blind detections is 16. The quantities of blind detections corresponding to AL1, AL2, AL4 and AL8 of DCI2 are respectively 2, 4, 2, 2, and the total number of blind detections is 10.

However, in the related art, DCI with different payload sizes supports the same AL, and the same AL corresponds to the same number of blind detections. For example, for foregoing DCI1 and DCI2, DCI1 and DCI2 both correspond to AL1, AL2, AL4 and AL8. Besides, the quantities of blind detections corresponding to AL1, AL2, AL4 and AL8 are respectively 6, 6, 2, 2 in sequence.

Based on foregoing comparison, it can be seen that, in the embodiment, the number of blind detections needed by DCI with greater payload size may be reduced.

Optionally, in the corresponding relationship, the first number is less than the second number. The first number is a sum of quantities of search space corresponding to all the ALs of a greater one between the first payload size and the second payload size. The second number is a sum of quantities of search space corresponding to all the ALs of a smaller one between the first payload size and the second payload size.

In the embodiment, the number of search space corresponding to all the ALs of DCI with different payload sizes is different. Specifically, the number of search space corresponding to all the ALs of DCI with greater payload size may be set to be smaller. For example, if DCI includes DCI1 with payload size 60 bit, and DCI2 with payload size 90 bit, the number of search space corresponding to all the ALs of DCI2 may be set to be less than the number of search space, which corresponds to all the ALs of DCI1. If DCI includes DCI1 with payload size 60 bit, DCI2 with payload size 90 bit, and DCI3 with payload size 120 bit, the number of search space corresponding to all the ALs of DCI2 may be set to be less than the number of search space, which corresponds to all the ALs of DCI1. The number of search space corresponding to all the ALs of DCI3 may be set to be less than the number of search space, which corresponds to all the ALs of DCI2.

It should be noted that, in the embodiment, the type of DCI payload size is not limited to the first payload size and the second payload size. That is, there may be DCI with three or more payload sizes. Specifically, the type of DCI payload size may be determined implicitly based on other parameters, or may be determined explicitly based on network configuration or protocol convention.

Optionally, in the corresponding relationship, the same AL corresponds to the same number of search space. The first AL is greater than the second AL. The first AL is the maximum AL among all the ALs corresponding to a greater one between the first payload size and the second payload size. The second AL is the maximum AL among all the ALs corresponding to a smaller one between the first payload size and the second payload size.

In the embodiment, the same AL corresponds to the same number of Candidates. For example, the number of Candidates corresponding to AL1, AL2, AL4, AL8 and AL16 is respectively 6, 6, 2, 2 and 2.

In the embodiment, the DCI with different payload sizes supports different ALs. Specifically, the maximum AL among all the ALs of DCI with a greater payload size may be set to be greater, so as to transmit DCI with AL as greater as possible, and reduce the number of blind detections. For example, the DCI includes DCI1 with payload size 60 bit, and DCI2 with payload size 90 bit. Subsequently, the maximum AL among all the ALs of DCI2 may be set to be greater than the maximum AL, which is among all the ALs of DCI1. If DCI includes DCI1 with payload size 60 bit, DCI2 with payload size 90 bit and DCI3 with payload size 120 bit, the maximum AL among all the ALs of DCI2 may be set to be greater than the maximum AL, which is among all the ALs of DCI1. The maximum AL among all the ALs of DCI3 may be set to be greater than the maximum AL, which is among all the ALs of DCI2.

For example, with reference to foregoing Table 3 and Table 5, in the embodiment, not only the AL corresponding to DCI with different payload sizes may be configured flexibly, but also the number of blind detections of DCI with a greater payload size may be reduced.

It should be noted that, in the embodiment, the type of DCI payload size is not limited to the first payload size and the second payload size. That is, there may be DCI with three or more payload sizes. Specifically, the type of DCI payload size may be determined implicitly based on other parameters, and may be determined explicitly based on network configuration or protocol convention.

Optionally, in the corresponding relationship, the third AL is greater than the fourth AL. The third AL is the minimum AL of all the ALs corresponding to the greater one between the first payload size and the second payload size. The fourth AL is the minimum AL of all the ALs corresponding to the smaller one between the first payload size and the second payload size.

In the embodiment, since the DCI with a greater payload size has a lower probability of using a lower AL, the minimum AL among all the ALs corresponding to the DCI with greater payload size may be set to be greater than the minimum AL, which is among all the ALs corresponding to the DCI with smaller payload size, so as to avoid the DCI with greater payload size using a lower AL.

For example, with reference to foregoing Table 5, the minimum AL (that is, AL=2) among all the ALs of DCI2 is greater than the minimum AL (that is, AL=1), which is among all the ALs of DCI1. The maximum AL (that is, AL=16) among all the ALs of DCI2 is greater than the maximum AL (that is, AL=8), which is among all the ALs of DCI1.

Optionally, in the corresponding relationship, corresponding to the same AL, the number of Candidates corresponding to the greater one between the first payload size and the second payload size is less than, or equal to the number of Candidates corresponding to the smaller one between the first payload size and the second payload size. And, there is at least one AL. Corresponding to the at least one AL, the number of Candidates corresponding to the greater one between the first payload size and the second payload size is less than the number of Candidates, which corresponds to the smaller one between the first payload size and the second payload size In the embodiment, the number of Candidates corresponding to the same AL of DCI with different payload sizes is different. Specifically, since DCI with greater payload size has a lower probability for using the lower AL, the number of Candidates corresponding to lower AL may be set to be smaller. For example, with reference to Table 6, the number of blind detections respectively corresponding to AL1 and AL2 of DCI2 is 0 and 2, such that the total number of blind detections of DCI2 is less than that of DCI1. Compared with the related art, the total number of blind detections of DCI2 is reduced. More particularly, the number of blind detections of lower AL is reduced, so as to reduce power consumption of a mobile communication terminal.

Figure 3:
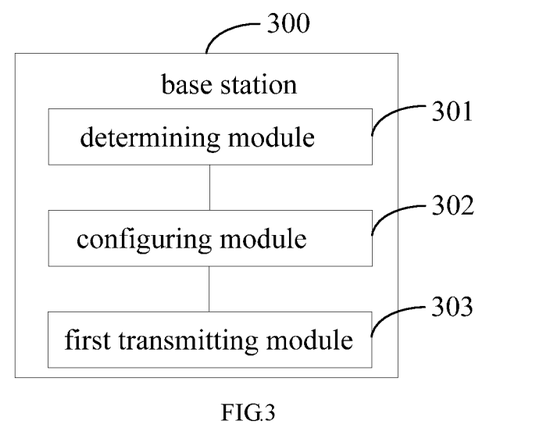
FIG. 3 is a schematic diagram illustrating structure of a base station, in accordance with an embodiment of the present disclosure.

An embodiment of the present disclosure further provides a base station. FIG. 3 is a schematic diagram illustrating a base station, in accordance with an embodiment of the present disclosure. As shown in FIG. 3, a base station 300 includes a determining module 301, a configuring module 302, and a first transmitting module 303.

The determining module 301 is configured to determine configuration information of to-be-transmitted downlink control information (DCI), by using a corresponding relationship between DCI AL, and/or, a number of blind detections corresponding to AL, and payload size of DCI.

The configuring module 302 is configured to configure the to-be-transmitted DCI, by using the configuration information.

The first transmitting module 303 is configured to transmit the to-be-transmitted DCI to a mobile communication terminal.

Figure 4:
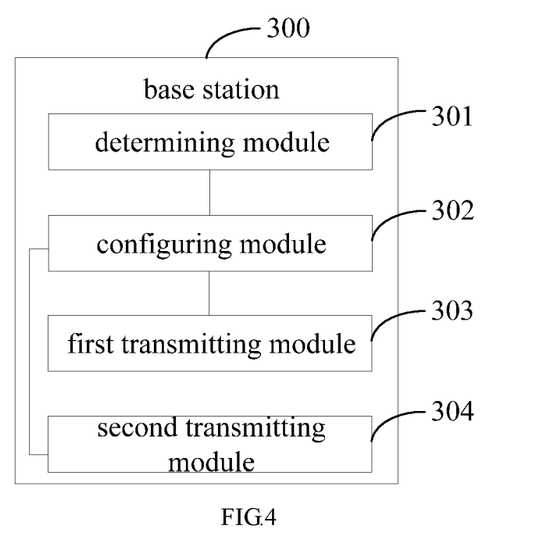
FIG. 4 is a schematic diagram illustrating structure of a base station, in accordance with another embodiment of the present disclosure.

Optionally, with reference to FIG. 4, the base station 300 further includes a second transmitting module 304, which is configured to transmit the corresponding relationship to the mobile communication terminal.

Optionally, the corresponding relationship is transmitted through a Control Resource Set (CORESET).

Optionally, the corresponding relationship is transmitted through high-level signaling.

Optionally, in the corresponding relationship, a first number is less than a second number. The first number is a sum of the number of search space corresponding to all the ALs of a greater one between the first payload size and the second payload size. The second number is a sum of the number of search space corresponding to all the ALs of a smaller one between the first payload size and the second payload size.

Optionally, in the corresponding relationship, the same AL corresponds to the same number of Candidates. A first AL is greater than a second AL. The first AL is the maximum AL among all the ALs of the greater one between the first payload size and the second payload size. The second AL is the maximum AL among all the ALs corresponding to the smaller one between the first payload size and the second payload size.

Optionally, in the corresponding relationship, a third AL is greater than a fourth AL. The third AL is the minimum AL among all the ALs of the greater one between the first payload size and the second payload size. The fourth AL is the minimum AL among all the ALs of the smaller one between the first payload size and the second payload size.

Optionally, in the corresponding relationship, corresponding to the same AL, the number of Candidates corresponding to the greater one between the first payload size and the second payload size is less than, or equal to the number of Candidates corresponding to the smaller one between the first payload size and the second payload size. And, there is at least one AL. Corresponding to the at least one AL, the number of Candidates corresponding to the greater one between the first payload size and the second payload size is less than the number of Candidates, which corresponds to the smaller one between the first payload size and the second payload size.

In the base station 300 provided by the embodiment of the present disclosure, the determining module 301 determines the configuration information of the to-be-transmitted DCI, by using the corresponding relationship, which is between DCI AL, and/or, the number of blind detections corresponding to the AL, and payload size of the DCI; the configuring module 302 configures the to-be-transmitted DCI, by using the configuration information; and, the first transmitting module 303 transmits the to-be-transmitted DCI to the mobile communication terminal. In the embodiment, the payload size of DCI is related with the DCI AL, and/or, the number of blind detections corresponding to the AL, this is different from the related art, where payload size of DCI is not considered, when configuring DCI. A new DCI configuration mode is provided, which improves the flexibility for configuring DCI.

Figure 5:
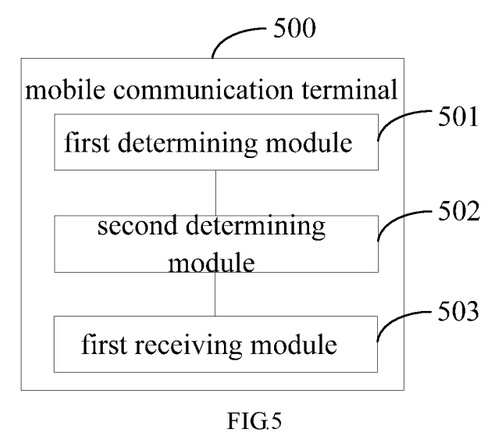
FIG. 5 is a schematic diagram illustrating structure of a mobile communication terminal, in accordance with an embodiment of the present disclosure.

An embodiment of the present disclosure further provides a mobile communication terminal. FIG. 5 is a schematic diagram illustrating a mobile communication terminal, in accordance with an embodiment of the present disclosure.

As shown in FIG. 5, a mobile communication terminal 500 includes a first determining module 501, a second determining module 502 and a first receiving module 503.

The first determining module 501 is configured to determine one, or several possible payload sizes of to-be-received Downlink Control Information (DCI).

The second determining module 502 is configured to determine configuration information corresponding to possible payload size.

The first receiving module 503 is configured to receive the to-be-received DCI from a base station, based on the configuration information.

Figure 6:
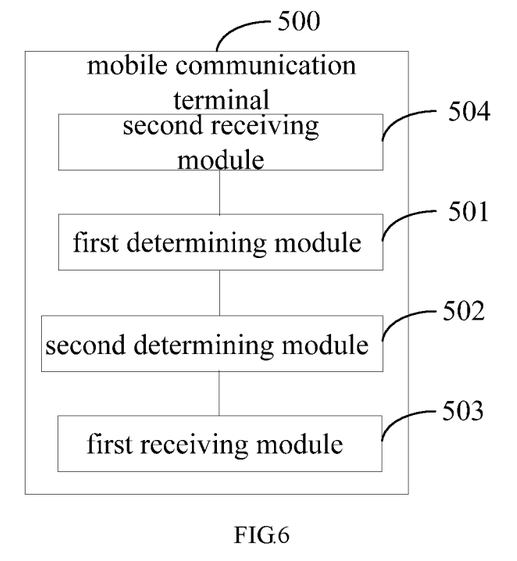
FIG. 6 is a schematic diagram illustrating structure of a mobile communication terminal, in accordance with another embodiment of the present disclosure.

Optionally, with reference to FIG. 6, the mobile communication terminal 500 further includes a second receiving module 504, configured to receive a Control Resource Set (CORESET) corresponding to the payload size of the to-be-received DCI from the base station, in which the CORESET records the configuration information associated with an Aggregation Level (AL) of the to-be-received DCI.

Correspondingly, the first determining module 501 is configured to determine possible payload size, based on the CORESET.

Correspondingly, the second determining module 502 is configured to determine the configuration information, by analyzing the CORESET.

Optionally, the CORESET is transmitted through high-level signaling.

Optionally, the second determining module 502 is configured to determine the configuration information corresponding to possible payload size, based on the corresponding relationship between DCI AL, and/or, the number of blind detections corresponding to the AL, and payload size of DCI.

Optionally, in the corresponding relationship, a first number is less than a second number. The first number is a sum of the number of Candidates corresponding to all the ALs of a greater one between a first payload size and a second payload size. The second number is a sum of the number of Candidates corresponding to all the ALs of a smaller one between the first payload size and the second payload size.

Optionally, in the corresponding relationship, the same AL corresponds to the same number of Candidates. A first AL is greater than a second AL. The first AL is the maximum AL among all the ALs corresponding to the greater one between the first payload size and the second payload size. The second AL is the maximum AL among all the ALs corresponding to the smaller one between the first payload size and the second payload size.

Optionally, in the corresponding relationship, a third AL is greater than a fourth AL. The third AL is the minimum AL among all the ALs of the greater one between the first payload size and the second payload size. The fourth AL is the minimum AL among all the ALs of the smaller one between the first payload size and the second payload size.

Optionally, in the corresponding relationship, corresponding to the same AL, the number of Candidates corresponding to the greater one between the first payload size and the second payload size is less than, or equal to the number of Candidates, which corresponds to the smaller one between the first payload size and the second payload size. And, there is at least one AL. Corresponding to the at least one AL, the number of Candidates corresponding to the greater one between the first payload size and the second payload size is less than the number of Candidates, which corresponds to the smaller one between the first payload size and the second payload size.

In the mobile communication terminal 500 provided by the embodiment of the present disclosure, the first determining module 501 determines one, or several possible payload sizes of the to-be-received DCI; the second determining module 502 determines the configuration information corresponding to the possible payload size; the first receiving module 503 receives the to-be-received DCI from the base station, based on the configuration information. In the embodiment, DCI with different payload sizes is configured with corresponding configuration information, and the to-be-received DCI is received based on the configuration information. Compared with the related art, in which payload size of DCI is not considered, when receiving the DCI, a new DCI receiving mode is provided.

Figure 7:
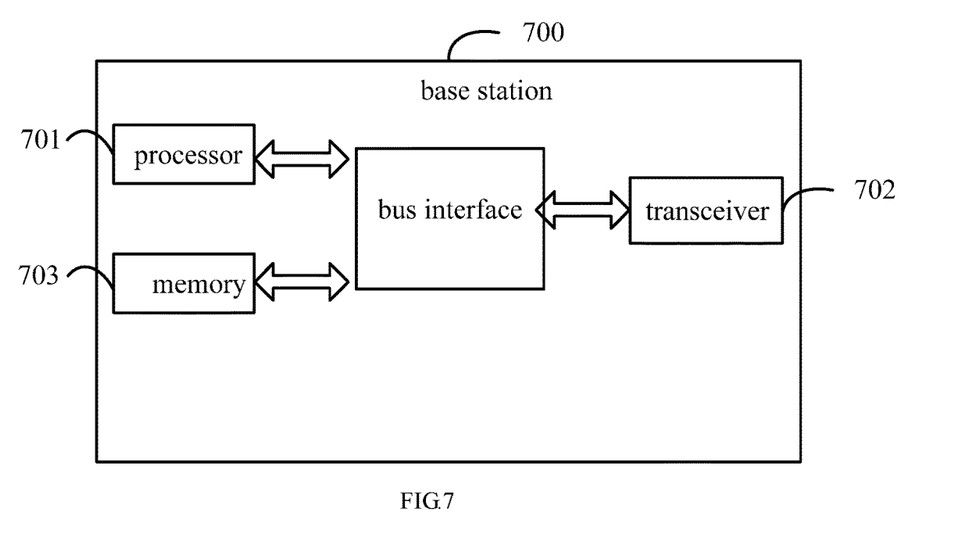
FIG. 7 is a schematic diagram illustrating structure of a base station, in accordance with still another embodiment of the present disclosure.

An embodiment of the present disclosure also provides a base station. FIG. 7 is a schematic diagram illustrating a base station, in accordance with an embodiment of the present disclosure. As shown in FIG. 7, a base station 700 includes a processor 701, a transceiver 702, a memory 703 and a bus interface.

The processor 701 is configured to read a program from the memory 703, and perform the following process:

determining configuration information of to-be-transmitted Downlink Control Information (DCI), by using a corresponding relationship between DCI Aggregation Level (AL), and/or, a number of blind detections corresponding to the AL, and a payload size of the DCI;

configuring the to-be-transmitted DCI, based on the configuration information; and, transmitting the to-be-transmitted DCI to a mobile communication terminal.

In FIG. 7, the bus architecture may include any number of interconnected buses and bridges. Specifically, one or more processors represented by the processor 701 and various circuits of memory represented by the memory 703 are linked together. The bus architecture can also link various other circuits, such as peripherals, voltage regulators, and power management circuits, as is known in the art. Therefore, it will not be further described. The bus interface provides an interface. The transceiver 702 may be multiple components, including a transmitter and a receiver, providing units for communicating with various other devices on a transmission medium.

The processor 701 is in charge of managing bus architecture and general processing. The memory 703 may store data used by the processor 701 when performing operations.

Optionally, the processor 701 is further configured to transmit the corresponding relationship to the mobile communication terminal.

Optionally, the corresponding relationship is transmitted through the CORESET.

Optionally, the CORESET is transmitted through high-level signaling.

Optionally, in the corresponding relationship, a first number is less than a second number. The first number is a sum of number of Candidates corresponding to all the ALs of a greater one between a first payload size and a second payload size. The second number is a sum of number of Candidates corresponding to all the ALs of a smaller one between the first payload size and the second payload size.

Optionally, in the corresponding relationship, the same AL corresponds to the same number of Candidates. A first AL is greater than a second AL. The first AL is the maximum AL among all the ALs of the greater one between the first payload size and the second payload size. The second AL is the maximum AL among all the ALs of the smaller one between the first payload size and the second payload size.

Optionally, in the corresponding relationship, a third AL is greater than a fourth AL. The third AL is the minimum AL among all the ALs of the greater one between the first payload size and the second payload size. The fourth AL is the minimum AL among all the ALs of the smaller one between the first payload size and the second payload size.

Optionally, in the corresponding relationship, corresponding to the same AL, the number of Candidates corresponding to the greater one between the first payload size and the second payload size is less than, or equal to the number of Candidates, which corresponds to the smaller one between the first payload size and the second payload size. And, there is at least one AL. Corresponding to the at least one AL, the number of Candidates corresponding to the greater one between the first payload size and the second payload size is less than the number of Candidates, which corresponds to the smaller one between the first payload size and the second payload size.

In the base station 700 provided by the embodiment of the present disclosure, the configuration information of to-be-transmitted DCI is determined, by using the corresponding relationship between DCI AL, and/or, the number of blind detections corresponding to the AL, and payload size of DCI; the to-be-transmitted DCI is configured, based on the configuration information; and, the to-be-transmitted DCI is transmitted to the mobile communication terminal. In the embodiment, the DCI AL, and/or, the number of blind detections corresponding to the AL are related with the payload size of DCI, this is different from the related art, in which payload size of DCI is not considered when configuring the DCI. A new DCI configuration method is provided, which improves the flexibility for configuring the DCI.

Figure 8:
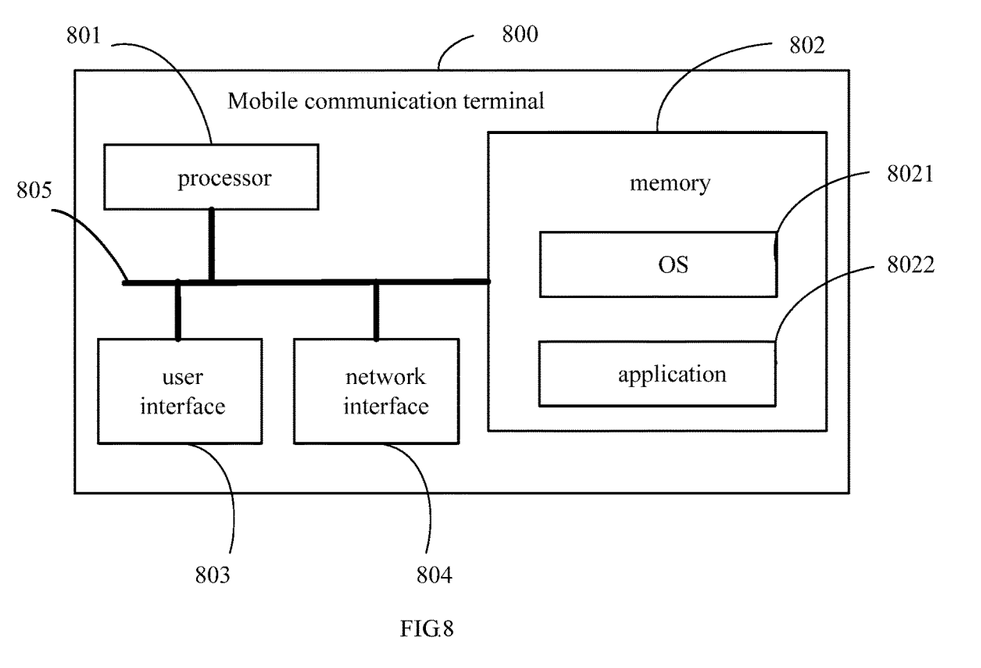
FIG. 8 is a schematic diagram illustrating structure of a mobile communication terminal, in accordance with still another embodiment of the present disclosure.

An embodiment of the present disclosure also provides a mobile communication terminal. FIG. 8 is a schematic diagram illustrating a mobile communication terminal, which is provided by an embodiment of the present disclosure. As shown in FIG. 8, a mobile communication terminal 800 includes: at least one processor 801, a memory 802, at least one network interface 804 and a user interface 803. Each component in the mobile communication terminal 800 is coupled through a bus system 805. It should be understood that, the bus system 805 is configured to implement connection communication among these components. In addition to data bus, the bus system 805 further includes power bus, control bus and status signal bus. However, for clarity of description, various buses are labeled as bus system 805 in FIG. 8.

The user interface 803 may include a display, a keyboard, or a clicking device (e.g., a mouse, a trackball, a touchpad, or a touch screen, etc.).

It should be understood that, in the embodiment of the present disclosure, the memory 802 may be a transitory memory, or a non-transitory memory, or may include both of the transitory memory and the non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. Many forms of RAM are available by way of illustration and not limitation, e.g., a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The memory 802 of the systems and methods described in the application is intended to include, without being limited to, these and any other suitable types of memory.

In some implementations, the memory 802 stores the following elements, executable modules, or data structures, or a subset thereof, or an extended set thereof: an Operating System (OS) 8021 and an application 8022.

The OS 8021 includes various system programs, e.g., a frame layer, a core library layer, a driver layer, etc., are used to implement various basic services and to handle hardware-based tasks. The application 8022 includes various applications, such as a media player (Media Player), a browser, and so on, for implementing various application services. A program implementing the method of the embodiments in the present disclosure may be included in the application 8022.

In the embodiment of the present disclosure, by calling a program or an instruction stored in the memory 802, specifically, a program or an instruction stored by the application 8022, the processor 801 is configured to: determine one, or several possible payload size of to-be-received DCI; determine configuration information corresponding to possible payload size; and, receive the to-be-received DCI from a base station, based on the configuration information.

The method provided by foregoing embodiments of the application may be applied to the processor 801, or may be implemented by the processor 801. The processor 801 may be an integrated circuit chip with signal processing capability. During the implementation process, each block of the foregoing method may be completed by an integrated logic circuit of hardware in the processor 801, or by an instruction in a form of software. The foregoing processor 801 may be a general processor, a Digital Signal Processor (DSP), an Application Specific Integrated Circuit (ASIC), a Field Programmable Gate Array (FPGA), or other programmable logic devices, discrete gate or transistor logic device, discrete hardware components. Each method, block, and logic diagram provided by the embodiment of the present disclosure may be implemented, or executed. The general processor may be a microprocessor, or any conventional processor, and so on. The blocks of the method provided by the embodiments of the present disclosure may be directly completed by the hardware decoding processor, or may be completed by a combination of hardware and software modules in the decoding processor. The software modules may be located in mature storage medium in the field, such as, the RAM, the flash memory, the ROM, the PROM, Electrically erasable programmable memory, and a register. The storage medium is located in the memory 802. The processor 801 reads information from the memory 802, and completes blocks of foregoing method in combination with the hardware.

It should be understood that, these embodiments described in the application may be implemented by hardware, software, firmware, middleware, microcode, or a combination thereof. For hardware implementation, in the one or more ASICs, DSPs, DSP Device (DSPDs), Programmable Logic Devices (PLDs), FPGAs, general processors, controllers, microcontrollers, microprocessors, a processing unit may be implemented in another electronic unit or a combination thereof, which is configured to implement the functions of the application.

For software implementation, techniques described in the application may be implemented, by executing modules (e.g., process, function, etc.) with corresponding functions in the application. Software codes may be stored in the memory, and executed by the processor. The memory may be implemented in the processor, or external to the processor.

Optionally, the processor 801 is further configured to: receive a CORESET corresponding to payload size of to-be-received DCI from the base station, in which the CORESET records configuration information associated with an AL of the to-be-received DCI. The processor 801 is further configured to determine possible payload size, based on the CORESET. The processor 801 is further configured to determine the configuration information, by analyzing the CORESET.

Optionally, the CORESET is transmitted through high-level signaling.

Optionally, the processor 801 is further configured to determine the configuration information corresponding to possible payload size, based on the corresponding relationship between DCI AL, and/or, the number of blind detections corresponding to the AL, and payload size of the DCI.

Optionally, in the corresponding relationship, a first number is less than a second number. The first number is a sum of the number of search space corresponding to all the ALs of a greater one between a first payload size and a second payload size. The second number is a sum of the number of search space corresponding to all the ALs of a smaller one between the first payload size and the second payload size.

Optionally, in the corresponding relationship, the same AL corresponds to the same number of Candidates. A first AL is greater than a second AL. The first AL is the maximum AL among all the ALs of the greater one between the first payload size and the second payload size. The second AL is the maximum AL among all the ALs of the smaller one between the first payload size and the second payload size.

Optionally, in the corresponding relationship, a third AL is greater than a fourth AL. The third AL is the minimum AL among all the ALs corresponding to the greater one between the first payload size and the second payload size. The fourth AL is the minimum AL among all the ALs corresponding to the smaller one between the first payload size and the second payload size.

Optionally, in the corresponding relationship, corresponding to the same AL, the number of Candidates corresponding to the greater one between the first payload size and the second payload size is less than, or equal to the number of Candidates, which corresponds to the smaller one between the first payload size and the second payload size. And, there is at least one AL. Corresponding to the at least one AL, the number of Candidates corresponding to the greater one between the first payload size and the second payload size is less than the number of Candidates, which corresponds to the smaller one between the first payload size and the second payload size.

In the embodiment of the present disclosure, the mobile communication terminal 800 determines the configuration information corresponding to possible payload size, by determining one, or several possible payload sizes of to-be-received DCI, and receives the to-be-received DCI from the base station, based on the configuration information. In the embodiment, DCI with different payload sizes is configured with corresponding configuration information, and the to-be-received DCI is received based on the configuration information. Compared with the related art, in which payload size of DCI is not considered when receiving DCI, a new method for receiving DCI is provided.

An embodiment of the present disclosure also provides a computer readable storage medium, which stores computer programs, that when executed by the processor, causing the processor to implement a method for transmitting DCI according to any foregoing method embodiment.

An embodiment of the present disclosure also provides a computer readable storage medium, which stores computer programs, that when executed by the processor, causing the processor to implement a method for receiving DCI according to any foregoing method embodiment.

Persons having ordinary skill in the art may learn that, units and algorithm blocks of each example described by embodiments of the application may be implemented in electronic hardware, or in a combination of computer software and electronic hardware. Whether these functions are performed by hardware or software depends on specific application and design constraints of technical solutions. For each specific application, a person skilled in the art may adopt a different method to implement the described functions. However, such implementation should not be considered to go beyond the scope of the application.

Persons having ordinary skill in the art may clearly learn that, for convenience and conciseness of description, the specific working process of above-described system, device and unit may refer to corresponding process of foregoing method embodiments, which is not repeated here.

In the embodiments of the application, it should be understood that, the disclosed devices and methods may be implemented with other methods. For example, the above-described device embodiments are only illustrative, e.g., the division of the unit is only a logic function division. In practical implementation, there may be another division method. For example, multiple units or components may be combined, or integrated into another system, or some features may be omitted, or not executed. From another point, the mutual coupling or direct coupling, or communication connection shown or discussed may be indirect coupling, or communication connections through some interfaces, devices, or units, which may be electronic, mechanical, or in other form.

Units described as separate components may be, or may be not physically separate. A component displayed as a unit may be, or may be not a physical unit, that is, it may be located in one place, or may be distributed to multiple network units. According to practical requirements, some units or all the units may be selected to implement the objective of solutions in the embodiments of the application.

In addition, in each embodiment of the present disclosure, various functional units may be integrated into a processing unit. Alternatively, each unit physically exists alone. Still alternatively, two or more units may be integrated into one unit.

When the functions are implemented in the form of software functional unit, which is sold or used as an independent product, such software functional unit may be stored in a computer readable storage medium. Based on such understandings, the technical solution of the present disclosure, or, a part contributing to the related art, or a part of the technical solution may be embodied in the form of a software product. The computer software produce is stored in one storage medium, including several instructions to enable a computer device (may be a Personal Computer (PC), a server, or a network device, etc.) to implement all the blocks, or some blocks in the method of each embodiment of the present disclosure. Foregoing storage medium includes various media that can store program codes, such as a U disk, a mobile hard disk, an ROM, an RAM, a disk, or a Compact Disk (CD), and so on.

Foregoing is only specific implementations of the application. However, protection scope of the application is not limited. Any changes or substitutions that are obvious to those skilled in the art within the scope of the application are covered by the scope of the application. Therefore, the protection scope of the disclosure should be determined by the scope of the claims.

What is claimed is:

1. A method for transmitting Downlink Control Information (DCI), applied to a base station, comprising:
   determining an Aggregation Level (AL) of to-be-transmitted DCI, based on a corresponding relationship between a DCI AL and a DCI payload size, and/or, determining the number of blind detections of the to-be-transmitted DCI based on a corresponding relationship between the number of blind detections corresponding to the DCI AL and the DCI payload size;
   configuring the to-be-transmitted DCI based on the AL and/or the number of blind detections of the to-be-transmitted DCI; and,
   transmitting the to-be-transmitted DCI to a mobile communication terminal;
   wherein the method further comprises:
   transmitting a Control Resource Set (CORESET) to the mobile communication terminal; wherein the CORESET is used to determine possible payload size of the to-be-transmitted DCI, and determine an AL and/or the number of blind detections corresponding to the possible payload size.

2. The method according to claim 1, wherein the CORESET is transmitted through high-level signaling.

3. The method according to claim 1, wherein in the corresponding relationship, a first number is less than a second number; the first number is a sum of number of search space corresponding to all the ALs of a greater one between a first payload size and a second payload size; and the second number is a sum of number of search space corresponding to all the ALs of a smaller one between the first payload size and the second payload size.

4. The method according to claim 3, wherein in the corresponding relationship, the same AL corresponds to the same number of Candidates, a first AL is greater than a second AL; the first AL is the maximum AL among all the ALs corresponding to the greater one between the first payload size and the second payload size; and the second AL is the maximum AL among all the ALs corresponding to the smaller one between the first payload size and the second payload size.

5. The method according to claim 4, wherein in the corresponding relationship, a third AL is greater than a fourth AL; the third AL is the minimum AL among all the ALs corresponding to the greater one between the first payload size and the second payload size, and the fourth AL is the minimum AL among all the ALs corresponding to the smaller one between the first payload size and the second payload size.

6. The method according to claim 3, wherein in the corresponding relationship, corresponding to the same AL, the number of Candidates corresponding to the greater one between the first payload size and the second payload size is less than, or equal to the number of Candidates, which corresponds to the smaller one between the first payload size and the second payload size; and there is at least one AL, corresponding to the at least one AL, the number of Candidates corresponding to the greater one between the first payload size and the second payload size is less than the number of Candidates, which corresponds to the smaller one between the first payload size and the second payload size.

7. A method for receiving Download Control Information (DCI), applied to a mobile communication terminal, comprising:
   determining one, or several possible payload sizes of to-be-received DCI;
   determining an Aggregation Level (AL) corresponding to the possible payload size, based on a corresponding relationship between a DCI AL and a DCI payload size; and/or, determining the number of blind detections corresponding to the possible payload size, based on a corresponding relationship between the number of blind detections corresponding to the DCI AL and the DCI payload size;
   receiving the to-be-received DCI from a base station, based on AL and/or the number of blind detections corresponding to the possible payload size;
   wherein the method further comprises:
   receiving a Control Resource Set (CORESET) corresponding to the payload size of the to-be-received DCI from the base station, wherein the CORESET includes configuration information associated with an AL of the to-be-received DCI;
   wherein determining the possible payload size of the to-be-received DCI comprises: determining the possible payload size, based on the CORESET;
   wherein determining the AL and/or the number of blind detections corresponding to the possible payload size comprises: determining the AL and/or the number of blind detections corresponding to the possible payload size, by analyzing the CORESET.

8. The method according to claim 7, wherein the CORESET is transmitted through high-level signaling.

9. The method according to claim 7, wherein in the corresponding relationship, a first number is less than a second number; the first number is a sum of number of search space corresponding to all the ALs of a greater one between a first payload size and a second payload size, and the second number is a sum of number of search space corresponding to all the ALs of a smaller one between the first payload size and the second payload size.

10. The method according to claim 9, wherein in the corresponding relationship, the same AL corresponds to the same number of Candidates, a first AL is greater than a second AL; the first AL is the maximum AL among all the ALs corresponding to the greater one between the first payload size and the second payload size, and the second AL is the maximum AL among all the ALs corresponding to the smaller one between the first payload size and the second payload size.

11. The method according to claim 10, wherein in the corresponding relationship, a third AL is greater than a fourth AL; the third AL is the minimum AL among all the ALs corresponding to the greater one between the first payload size and the second payload size, and the fourth AL is the minimum AL among all the ALs corresponding to the smaller one between the first payload size and the second payload size.

12. The method according to claim 9, wherein in the corresponding relationship, corresponding to the same AL, the number of Candidates corresponding to the greater one between the first payload size and the second payload size is less than, or equal to the number of Candidates, which corresponds to the smaller one between the first payload size and the second payload size; and there is at least one AL, corresponding to the at least one AL, the number of Candidates corresponding to the greater one between the first payload size and the second payload size is less than the number of Candidates, which corresponds to the smaller one between the first payload size and the second payload size.

13. A mobile communication terminal, comprising a memory, a processor, and a computer program stored in the memory, which is executable by the processor, wherein when executing the program, the processor is caused to perform:
   determining one, or several possible payload sizes of to-be-received DCI;
   determining an Aggregation Level (AL) corresponding to the possible payload size, based on a corresponding relationship between a DCI AL and a DCI payload size; and/or, determining the number of blind detections corresponding to the possible payload size, based on a corresponding relationship between the number of blind detections corresponding to the DCI AL and the DCI payload size;
   receiving the to-be-received DCI from a base station, based on AL and/or the number of blind detections corresponding to the possible payload size;
   wherein the processor is further configured to perform:
   receiving a Control Resource Set (CORESET) corresponding to the payload size of the to-be-received DCI from the base station, wherein the CORESET includes configuration information associated with an AL of the to-be-received DCI;
   wherein determining the possible payload size of the to-be-received DCI comprises: determining the possible payload size, based on the CORESET;
   wherein determining the AL and/or the number of blind detections corresponding to the possible payload size comprises: determining the AL and/or the number of blind detections corresponding to the possible payload size, by analyzing the CORESET.

14. The mobile communication terminal according to claim 13, wherein the CORESET is transmitted through high-level signaling.

15. The mobile communication terminal according to claim 13, wherein in the corresponding relationship, a first number is less than a second number; the first number is a sum of number of search space corresponding to all the ALs of a greater one between a first payload size and a second payload size, and the second number is a sum of number of search space corresponding to all the ALs of a smaller one between the first payload size and the second payload size.

16. The mobile communication terminal according to claim 15, wherein in the corresponding relationship, the same AL corresponds to the same number of Candidates, a first AL is greater than a second AL; the first AL is the maximum AL among all the ALs corresponding to the greater one between the first payload size and the second payload size, and the second AL is the maximum AL among all the ALs corresponding to the smaller one between the first payload size and the second payload size.

17. The mobile communication terminal according to claim 16, wherein in the corresponding relationship, a third AL is greater than a fourth AL; the third AL is the minimum AL among all the ALs corresponding to the greater one between the first payload size and the second payload size, and the fourth AL is the minimum AL among all the ALs corresponding to the smaller one between the first payload size and the second payload size.

18. The mobile communication terminal according to claim 15, wherein in the corresponding relationship, corresponding to the same AL, the number of Candidates corresponding to the greater one between the first payload size and the second payload size is less than, or equal to the number of Candidates, which corresponds to the smaller one between the first payload size and the second payload size; and there is at least one AL, corresponding to the at least one AL, the number of Candidates corresponding to the greater one between the first payload size and the second payload size is less than the number of Candidates, which corresponds to the smaller one between the first payload size and the second payload size.

* * * * *